(12) United States Patent
Wang

(10) Patent No.: US 8,098,264 B2
(45) Date of Patent: Jan. 17, 2012

(54) METHOD AND APPARATUS FOR RENDERING COMPUTER GRAPHICS PRIMITIVE

(75) Inventor: Cai-Sheng Wang, Taipei (TW)

(73) Assignee: VIA Technologies, Inc., Taipei (TW)

( * ) Notice: Subject to any disclaimer, the term of this patent is extended or adjusted under 35 U.S.C. 154(b) by 832 days.

(21) Appl. No.: 12/171,899

(22) Filed: Jul. 11, 2008

(65) Prior Publication Data

US 2009/0002393 A1 Jan. 1, 2009

(51) Int. Cl.
*G06T 15/30* (2011.01)
(52) U.S. Cl. ...................................... 345/622
(58) Field of Classification Search ........... 345/620–624
See application file for complete search history.

(56) References Cited

U.S. PATENT DOCUMENTS

2004/0227772 A1* 11/2004 Huang et al. .................. 345/622
* cited by examiner

*Primary Examiner* — Jeffery A Brier
(74) *Attorney, Agent, or Firm* — Muncy, Geissler, Olds & Lowe, PLLC

(57) ABSTRACT

The present invention is directed to a method for rendering a computer graphics primitive intersected with one or more user-defined clipping planes. The method includes receiving a primitive, a clipping plane and a default scissor window; determining a second scissor window according to the spatial relationship among a first scissor window, the clipping plane and the vertices of the primitive; determining a group of pixels to be rendered by eliminating pixels not covered by an adjusted scissor window from the primitive; and determining a group of actually rendered pixels, in which the actually rendered pixels determining step includes removing the pixels meeting a clipping criterion from the group of pixels to be rendered. The present invention also includes an apparatus for performing the method.

18 Claims, 6 Drawing Sheets

METHOD AND APPARATUS FOR RENDERING COMPUTER GRAPHICS PRIMITIVE

BACKGROUND OF THE INVENTION

1. Field of the Invention

The present invention relates to the computer graphics technology, and more particularly to a method and apparatus for rendering a computer graphic primitive intersected with user-defined clipping planes.

2. Description of the Prior Art

The essential operations of three-dimensional ("3-D") computer graphics concern the generation, or rendering, of two-dimensional ("2-D") images of 3-D objects for display or presentation onto a display device or monitor, such as a Cathode Ray Tube (CRT) or a Liquid Crystal Display (LCD). The object may be a simple geometry primitive such as a point, a line segment, a triangle, or a polygon. More complex objects can be rendered onto a display device by representing the objects with a series of connected planar polygons, such as, for example, by representing the objects as a series of connected planar triangles. All geometry primitives may eventually be described in terms of one vertex or a set of vertices, for example, coordinate (x, y, z) that defines a point, for example, the endpoint of a line segment, or a corner of a triangle.

To generate a data set for display as a 2-D projection representative of a 3-D primitive onto a computer monitor or other display device, the vertices of the primitive are processed through a series of operations, or processing stages in a graphics-rendering pipeline. A generic pipeline is merely a series of cascading processing units, or stages, in which the output from a prior stage serves as the input for a subsequent stage. In the context of a graphics processor, these stages include, for example, pervertex operations, primitive assembly operations, pixel operations, texture assembly operations, rasterization operations, and fragment operations.

In a typical graphics display system, the objects are described with a number of small polygons, generally referred to as graphics primitives, which cover the surface of the object in the same manner that a number of small tiles can cover a wall or other surface. Each polygon is described as a list of vertex coordinates (X, Y, Z in "Model" coordinates) and some specification of material surface properties (i.e., color, texture, shininess, etc.). For three-dimensional objects with complex curved surfaces, the polygons in general must be triangles or quadrilaterals, and the latter can always be decomposed into pairs of triangles.

A transformation engine transforms the object coordinates in response to the angle of viewing selected by a user from user input. In addition, the user may specify the field of view, the size of the image to be produced, and the back end of the viewing volume so as to include or eliminate background as desired.

Once this viewing area has been selected, clipping logic, such as the scissor window, eliminates the graphics primitives (i.e., triangles) which are outside the viewing area and "clips" the graphics primitives which are partly inside and partly outside the viewing area. These clipped graphics primitives will correspond to the portion of the graphics primitives inside the viewing area with new edge(s) corresponding to the edge(s) of the viewing area. The vertices of the resulting graphics primitives are then transmitted to the next stage in coordinates corresponding to the viewing screen (in X, Y coordinates) with an associated depth for each vertex (the Z coordinate). In a typical system, the lighting model is next applied taking into account the light sources. The graphics primitives with their color values are then transmitted to the pixel interpolation module (or referred to as the attribute interpolation module), such as a rasterizer.

For each graphics primitive, the rasterizer determines which pixel positions the graphics primitive and attempts to write the associated color values and depth (Z value) into frame buffer cover. The rasterizer compares the depth values (Z) for the graphics primitive being processed with the depth value of a pixel, which may already be written into the frame buffer. If the depth value of the new graphics primitive pixel is smaller, indicating that it is in front of the primitives already written into the frame buffer, then its value will replace the value in the frame buffer because the new graphics primitive will obscure the graphics primitive previously processed and written into the frame buffer. This process is repeated until all of the graphics primitives have been rasterized. At that point, a video controller displays the contents of a frame buffer on a display a scan line at a time in raster order.

With this general background provided, reference is now made to FIG. 1, which shows a block diagram of a conventional pipelined computer graphics primitive rendering apparatus 100. The input data including the graphics primitive PR and the clipping logic CLogic is passed through the pipeline. The graphics primitive PR may include the location data (for example, vertices represented as spatial coordinates X, Y, Z). On the other hand, the clipping logic CLogic may include the default scissor window as well as one or more user-defined clipping planes UDCPs. The scissor window is usually represented as four boundary values, i.e., the values of the top, bottom, left and right boundaries of the viewing area The clipping plane UDCP may be represented as a space coordinate function, for example, $f(X,Y,Z)=aX+bY+cZ+d$. Particularly, the clipping plane UDCP may be configured to clip (i.e., removes) those pixels or points in the graphics primitives PR making the function $f(X,Y,Z)$ negative and only allow those pixels or points making the function $f(X,Y,Z)$ positive to show. The function $f(X,Y,Z)$ representing the clipping plane will be hereinafter referred to as the clipping plane function.

The input data (PR+CLogic) enters the vertex shader 102 first. The vertex shader 102 may perform various transformations on the vertices data of the graphics primitive PR. For example, the vertices data may be transformed from World coordinates into Model View coordinates, into Projection coordinates, and ultimately into Screen coordinates. The vertex shader 102 may also calculate or retrieve attributes of vertices of the graphics primitive PR, such as color and perspective correction factor (in the figure, VX_ATT represents the set comprising all such attributes). When the user defined clipping plane UDCP is included in the input data, the vertex shader 102 could also calculate the clipping judgment distances between the vertices of graphic primitives PR and the clipping plane UDCP (in the figure, VX_DISc represents the set comprising the clipping judgment distances for all vertices). Outcome of the clipping function $f(X,Y,Z)$ with its input parameters set to the coordinate of a vertex may be used as the clipping judgment distance between the vertex and the clipping plane UDCP represented by the clipping function $f(X,Y,Z)$. When the clipping judgment distance between a vertex and the clipping plane UDCP is negative, the vertex may be clipped and skipped in primitive displaying process; otherwise, i.e., when the distance is positive, the vertex may be shown.

Based on the output from the vertex shader 102, the pixel interpolation module 106 calculates all pixels PX contained in the graphics primitive PR and the attributes PX_ATT thereof, as well as the clipping judgment distances PX_DISc between all pixels PX and the clipping plane UDCP. Thereafter, a Z-test is performed in the Z-test module 108 on each pixel within the graphics primitive PR being operated upon. As is known, comparing a current Z-value (i.e., the depth value for a given pixel of the current graphics primitive PR) with a stored Z-value (stored in the buffer generally referred to as the Z buffer) for the corresponding pixel location performs the so-called Z-test. The stored Z-value provides the depth value for a previously rendered primitive for a given pixel location. If the current Z-value is not closer to the current viewpoint than the stored Z-value, then neither the frame buffer nor Z-buffer contents need to be replaced, as a previously rendered pixel will be deemed to be in front of the current pixel. If the current Z-value indicates a depth that is closer to the viewer's eye than the stored Z-value, then the current Z-value will replace the stored Z-value and the current graphic information (i.e., color) will replace the color information in the corresponding frame buffer pixel location (as determined by the pixel shader 110). The Z test module will read from the Z buffer all the pixels PXz passing the Z test. For pixels within the graphics primitive that are rendered and determined to be closer to the viewpoint than previously-stored pixels, information relating to the graphics primitive is passed on to the pixel shader 110 which determines color information for each of the pixels within the graphics primitive that are determined to be closer to the current viewpoint. Besides, the conventional computer graphics primitive rendering apparatus 100 may also include a color reading module 112 which reads color and transparency information used by the background presentation processing for the graphics primitive PR.

In regard to the situation with user defined clipping plane, the pixel shader 110 of the conventional computer graphics primitive rendering apparatus 100 processes the group of pixels PXz passing the Z test, removes the pixels with negative clipping judgment distances PXz_DISc, and outputs the actually rendered pixels PXr. However, all the clipping judgment distances of all the pixels PX in the graphics primitive PR may be completely determined in the pixel interpolation module 106. The process of the Z test module 108 does not reference the user defined clipping planes and related information, and thus wastes a lot of calculation and memory bandwidth in the Z testing on already clipped pixels. Furthermore, the pixel interpolation module 106 also wastes too many efforts on getting pixel attributes and calculating the clipping judgment distances of all pixels in the current graphics primitive PR. Some pixels in the graphics primitive PR may be removed in the phase of attribute interpolation.

In view of the foregoing disadvantages of the prior art, there is a need to provide an improvement to avoid system resource wasting and redundant calculation. It is also desirable that the whole performance can be enhanced but the original structure of the conventional computer graphics primitive rendering apparatus is not altered, so that the entire cost may be minimized.

SUMMARY OF THE INVENTION

The present invention provides a method for rendering a computer graphics primitive intersected with one or more user-defined clipping planes. In contrast with the prior art, the method disclosed in the present invention can avoid system resource wasting and redundant calculation.

The present invention also provides an apparatus for rendering a computer graphics primitive intersected with user-defined clipping planes. The apparatus will enhance the entire system performance without changing the base structure of the prior art system.

Based on an embodiment as follows, the present invention provides a computer graphics primitive rendering method, including the steps of: receiving a graphics primitive, a clipping plane and a default scissor window; determining a second scissor window according to a spatial relationship among a first scissor window, the clipping plane and vertices of the graphics primitive; determining a group of pixels to be rendered by removing pixels out of range of an adjusted scissor window from the graphics primitive; determining a group of actually rendered pixels by removing pixels meeting a clipping criterion from the group of pixels to be rendered; and displaying the group of actually rendered pixels.

Based on another embodiment, the present invention provides a computer graphics primitive rendering apparatus including a vertex shader, a scissor window adjustment module, a pixel interpolation module, and a pixel shader. The vertex shader is configured to receive a graphics primitive, a clipping plane and a default scissor window, and to determine a plurality of attributes of vertices of the graphics primitive. The scissor window adjustment module is configured to determine a second scissor window according to a spatial relationship among a first scissor window, the clipping plane and the graphic primitive. The pixel interpolation module is configured to determine a group of pixels to be rendered by removing pixels out of range of an adjusted scissor window from the graphics primitive. The pixel shader is configured to determine a group of actually rendered pixels by removing pixels meeting a clipping criterion from the group of pixels to be rendered, and output the group of actually rendered pixels to a display buffer.

DETAILED DESCRIPTION OF THE INVENTION

Figure 1:
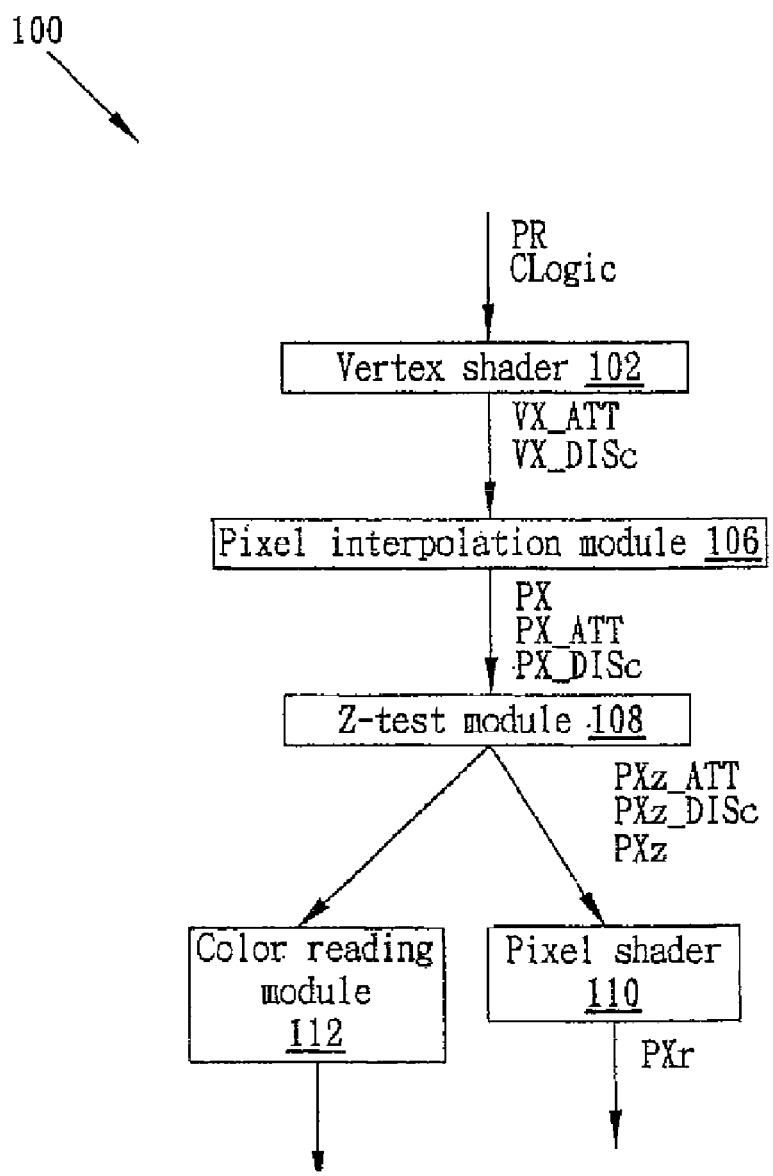
FIG. 1 shows a block diagram of a conventional pipelined computer graphics primitive rendering apparatus.
Figure 2:
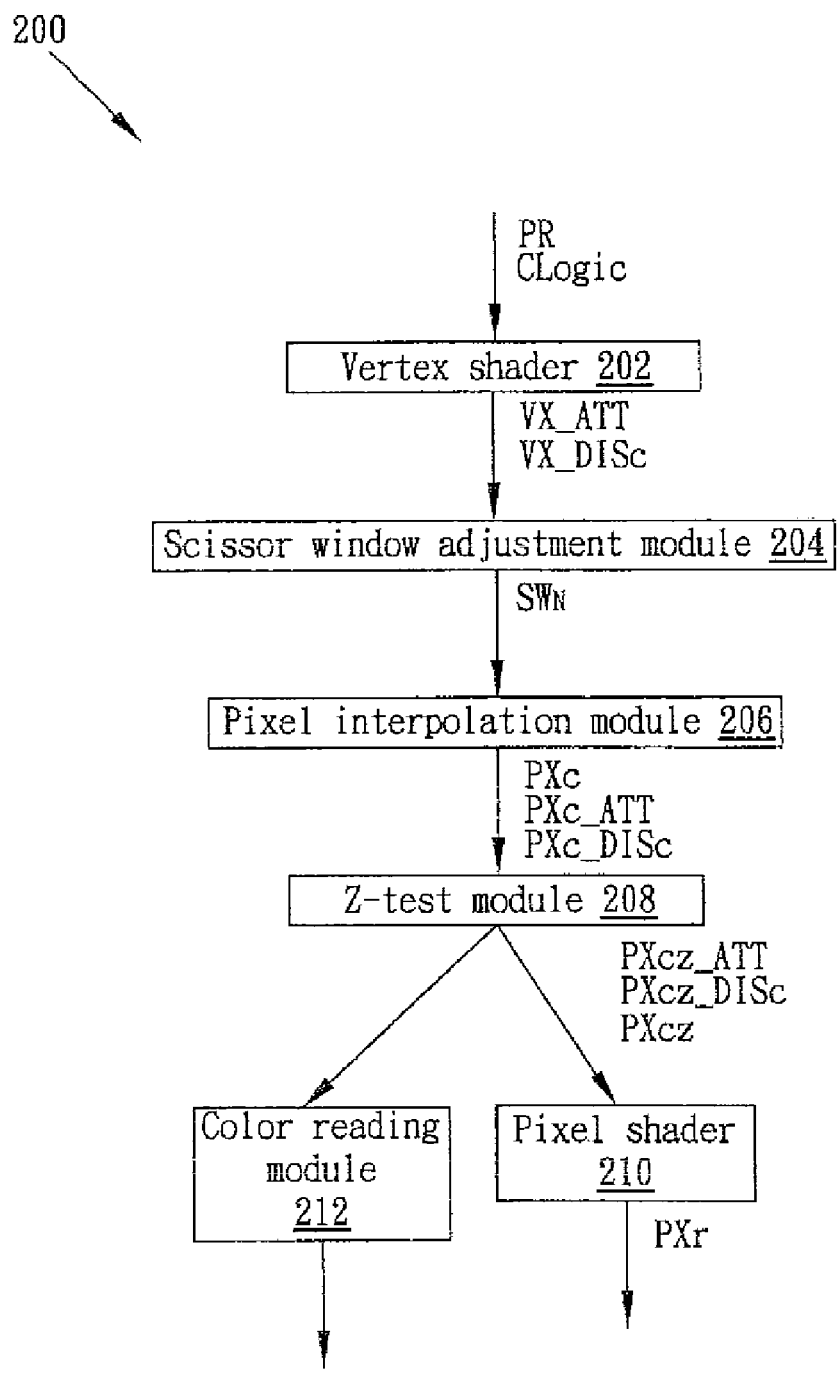
FIG. 2 shows a block diagram of the computer graphics primitive rendering apparatus in accordance with an embodiment of the present invention.

Referring to FIG. 2, which shows the block diagram of the computer graphics primitive rendering apparatus 200 in accordance with an embodiment of the present invention. The apparatus 200 includes a vertex shader 202, a scissor window adjustment module 204, a pixel interpolation module 206, a Z-test module 208, a pixel shader 210 and a color reading module 212. Detailed operation thereof will be described below with reference to the related drawings.

The vertex shader 202 may receive a graphics primitive PR, a plurality of clipping planes $UDCP_1$-$UDCP_n$ and the default scissor window DSW, and then determines the various attributes VX_ATT of vertices of the graphics primitive PR, such color, texture, and perspective correction factor, etc. The vertex shader 202 may also determine the clipping judgment distances VX_DISc between vertices of the graphics primitive PR and the plurality of clipping planes $UDCP_1$-$UDCP_n$. As mentioned above, a vertex is deemed to be removed by a clipping plane $UDCP_i$ (among $UDCP_1$-$UDCP_n$) if the clipping judgment distance between the vertex and the clipping plane $UDCP_i$ is negative.

Figure 3:
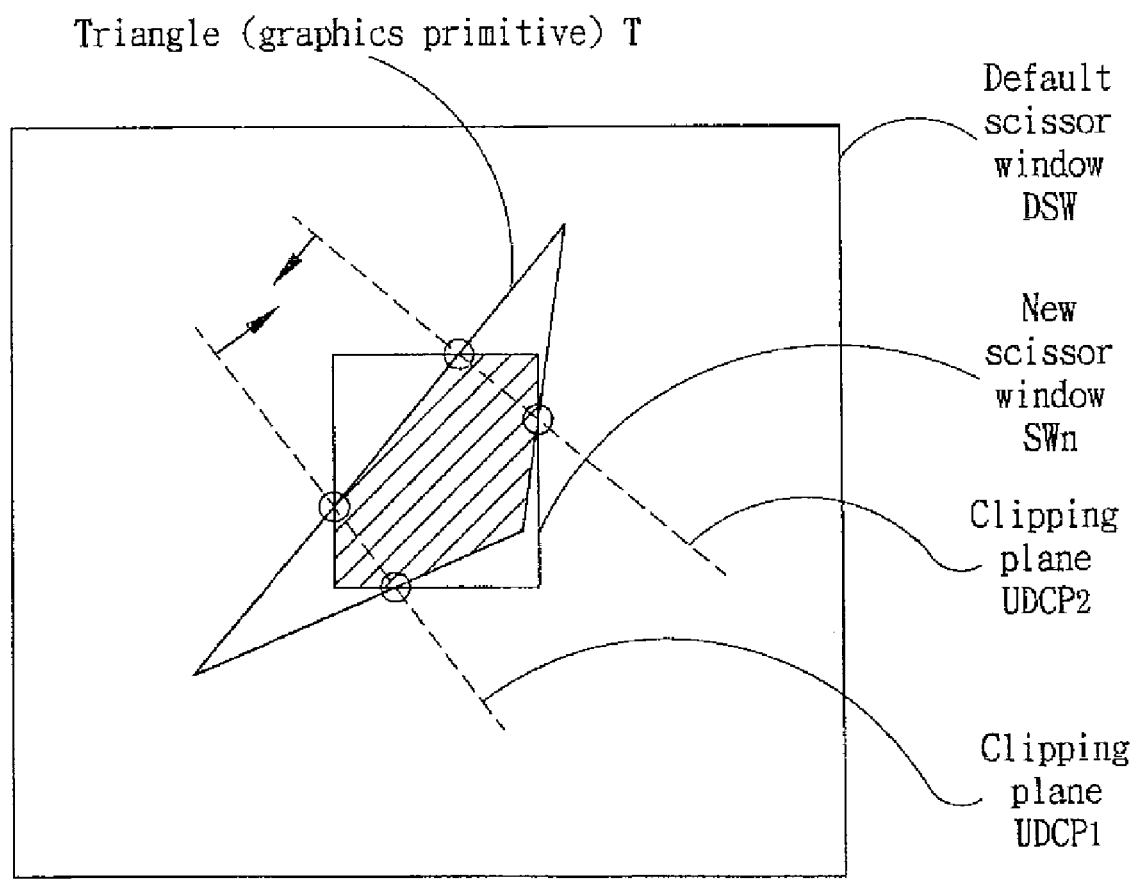
FIG. 3 illustrates the relationship among a graphics primitive, scissor windows and clipping planes, in which the graphic primitive is a triangle and number of the clipping planes is two.

The scissor window adjustment module 204 would determine a new scissor window SWn according to the spatial relationship among the default scissor window DSW, the plurality of clipping planes $UDCP_1$-$UDCP_n$ and the graphics primitive PR. The scissor window adjustment module 204 may first determine the clipping status of the graphics primitive PR according to the default scissor window DSW and the clipping judgment distance between vertices of the graphics primitive PR and the clipping plane $UDCP_1$, and then generates a first scissor window $SW_1$. Then, according to the first scissor window $SW_1$ and the clipping judgment distance between vertices of the graphic primitive PR and the clipping planes $UDCP_2$, it may generate a second scissor window $SW_2$. Iterating this procedure N times, it will generate an nth scissor window SWn, namely the new scissor window mentioned above. FIG. 3 illustrates, in which N is 2 and the graphics primitive PR is a triangle T, the relationship among the new scissor window SWn, a triangle T, the clipping plane $UDCP_1$, the clipping plane $UDCP_2$ and the default scissor window DSW. The directions of the two arrow signs point out the portion reserved (i.e., not clipped) by the clipping planes $UDCP_1$ and $UDCP_2$. Note that, in the general case, during an iteration other than the very first one, an updated (say, second, for the $2^{nd}$ iteration) scissor window is determined according to a spatial relationship among an old (say, first, for the $2^{nd}$ iteration) scissor window, some clipping plane and vertices of the graphics primitive. Furthermore, the old scissor window is derived from the default scissor windows through previous iterations and the range thereof is covered by the range of the default scissor window. On the other hand, through subsequent iterations, the final new scissor window SWn will be derived from the updated scissor window and the range thereof is covered by the range of the updated scissor window.

Figure 4:
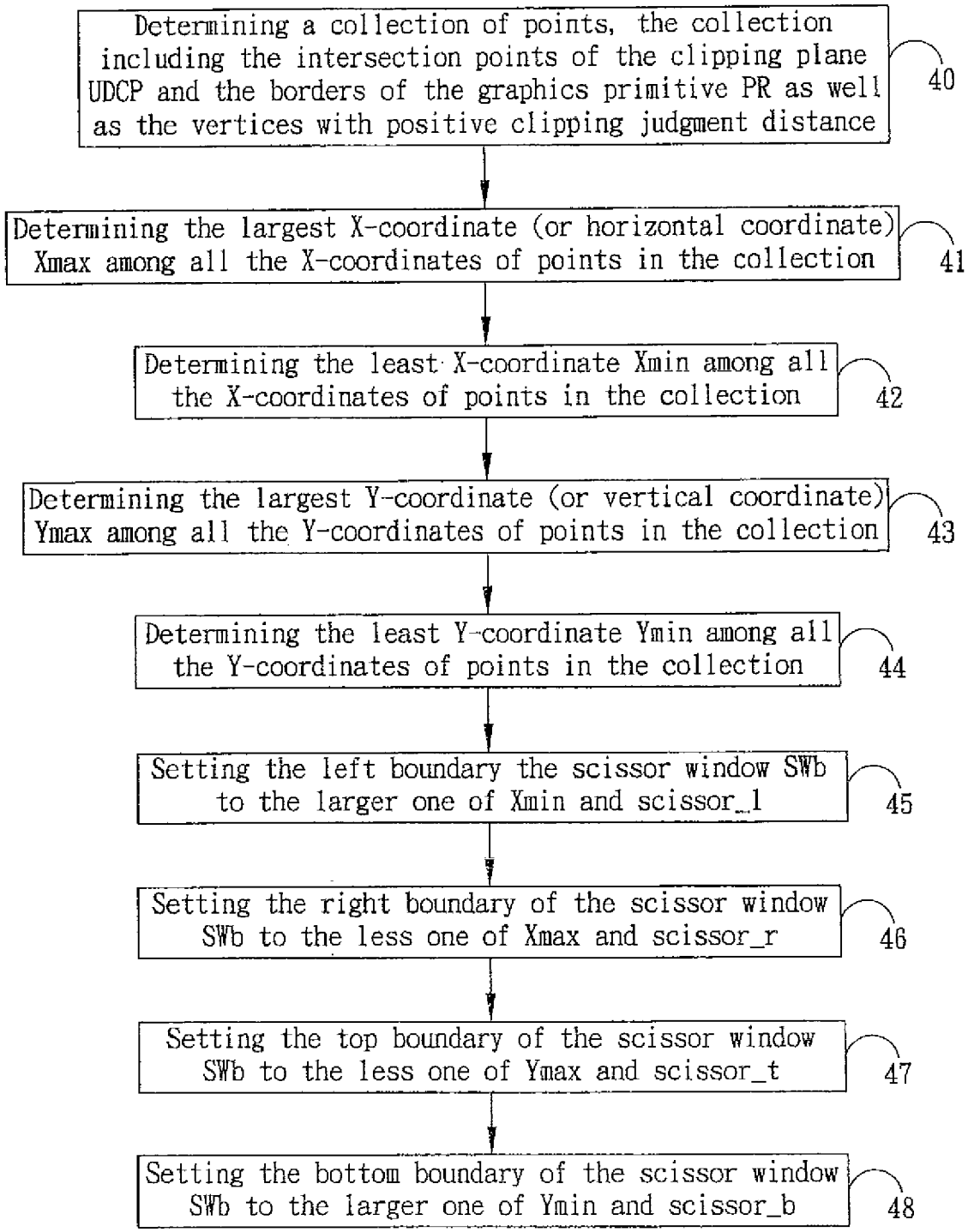
FIG. 4 illustrates a method that generates another scissor window by adjusting the range of an original one in accordance with an embodiment of the present invention.

Given any scissor window SWa and the clipping judgment distances between vertices of a graphics primitive PR and a clipping plane UDCP, an example is shown below to exemplify how to generate another scissor window SWb through adjusting the range of the scissor window SWa. If the clipping judgment distances between vertices of the graphic primitives PR and the clipping plane UDCP are all positive, which means that the graphics primitive PR is not clipped by the clipping plane UDCP, then the range of the scissor window SWb may be set equal to that of the scissor window SWa. If the clipping judgment distances of all the vertices are negative, then the graphic primitives PR is completely removed by the clipping plane UDCP and is not supposed to show up (in this special condition, the scissor window SWb may be construed to converge to a point). If the clipping judgment distances of all the vertices include positive values as well as negative values, then it is necessary to determine the intersection points of the clipping plane UDCP and the borders of the graphics primitive PR, and then the range of the scissor window SWb may be determined based on the vertices with positive clipping judgment distances as well as those intersection points. FIG. 4 illustrates a method to generate another scissor window SWb by adjusting the range of an original scissor window SWa, given a graphics primitive PR and a user defined clipping plane UDCP, according to an embodiment of the present invention. The range of scissor window SWa is defined by its left boundary scissor_l, right boundary scissor_r, top boundary scissor_t and bottom boundary scissor_b.

The method includes the step 40 of determining a collection of points, the collection including the intersection points of the clipping plane UDCP and the borders of the graphics primitive PR as well as the vertices with positive clipping judgment distances, each of the intersection points and the vertices in the collection being specified by the spatial coordinate, for example, (X, Y, Z). The method also includes the steps 41-44 respectively determining the largest X-coordinate (or horizontal coordinate) Xmax and the least X-coordinate Xmin among all the X-coordinates of points in the collection, as well as the largest Y-coordinate (or vertical coordinate) Ymax and the least Y-coordinate Ymin among all the Y-coordinates of points in the collection. Then, in steps 45 through 48, the method respectively set the left boundary, the right boundary, the top boundary and the bottom boundary of the scissor window SWb to the larger one of Xmin and scissor_l, the less one of Xmax and scissor_r, the less one of Ymax and scissor_t, and the larger one of Ymin and scissor_b.

Figure 5:
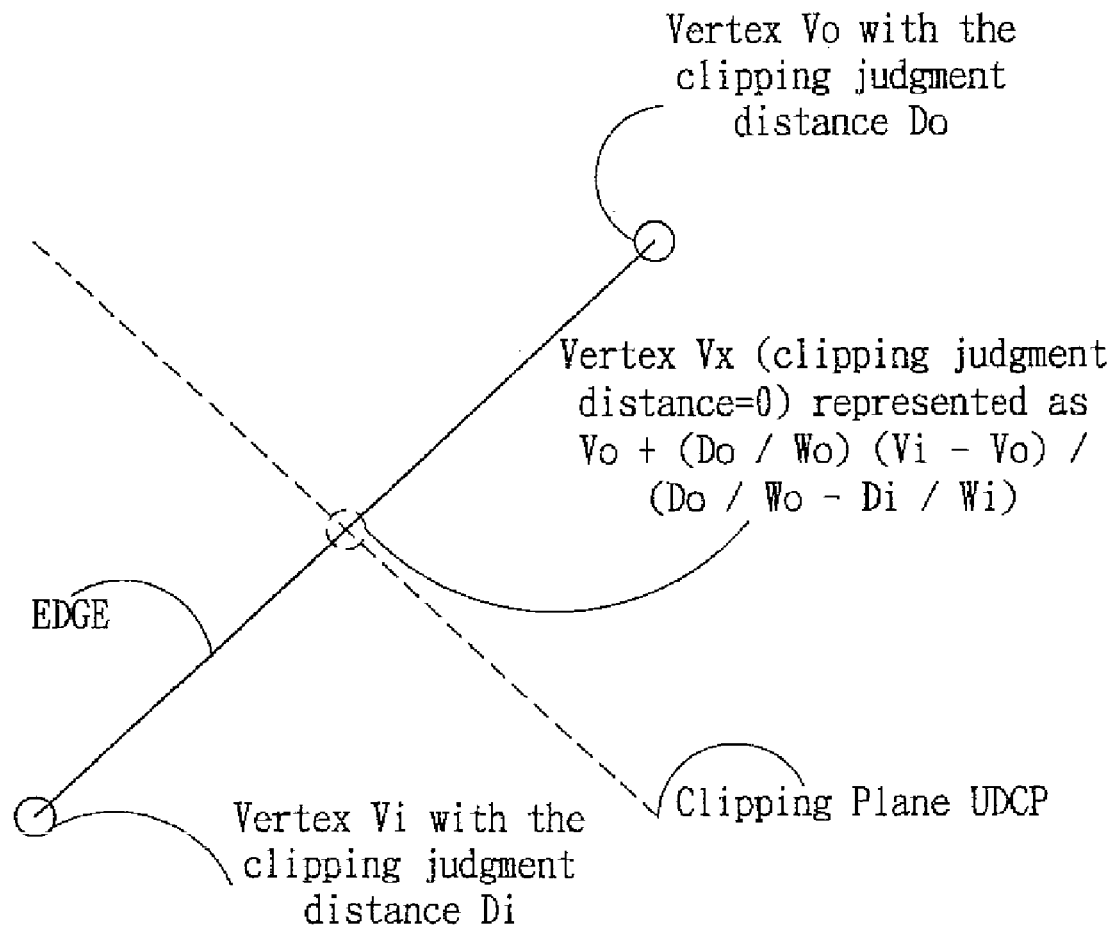
FIG. 5 shows a method for determining the intersection point of an edge and a clipping plane.

Determining the intersection points of the clipping plane UDCP and the borders of the graphics primitive PR calculates each intersection point of the clipping planes UDCP and each edge or boundary of the graphics primitive PR. Referring to FIG. 5, which shows a method for determining the intersection point of an edge EDGE and the clipping plane UDCP. The edge EDGE is defined by two vertices Vo ($X_o,Y_o,Z_o,W_o$) and Vi ($X_i,Y_i,Z_i,W_i$), in which Wo and Wi are perspective correction factors of points Vo and Vi respectively, which may be determined in vertex shader 202. Assuming that the clipping judgment distance between Vo (respectively Vi) and the clipping plane UDCP is Do (respectively Di), then the intersection point Vx may be calculated by the formula Vx=Vo+(Do/Wo)(Vi−Vo)/(Do/Wo−Di/Wi). Because Vx lies in the clipping plane UDCP, the clipping judgment distance thereof (with respect to UDCP) is thus 0. Those skilled in the art should appreciate that the clipping judgment distance should be corrected by the perspective correction factors (i.e., Wo and Wi), so as to interpolate the accurate coordinate of Vx.

Referring back to FIG. 2, based on the new scissor window SWn produced by the scissor window adjustment module 204, the pixel interpolation module 206 generates a group of pixels to be rendered PXc, their related attributes PXc_ATT and clipping judgment distances PXc_DISc with respect to the clipping plane through interpolation. The group of pixels to be rendered PXc is generated by removing pixels lying out of the new scissor window SWn from the graphic primitives PR. For example, PXc are the points lying in area with oblique lines as shown in FIG. 3. As can be noted by the illustration of FIG. 3, in contrast with the prior art, number of the pixels to be rendered decreases when the visible area is further constrained by the user defined clipping plane through the method according to the present invention, which will save time for processing the related attributes. Similarly, subsequent modules such as the Z-test module 208, the pixel shader 210 and the color reading module 212 in the computer graphics primitive rendering apparatus 200 will perform further processing on the pixels to be rendered PXc (the Z-test module 208 would perform the Z test such that the Z buffer includes the pixels PXcz that pass the Z test among the input pixels PXc), and the consumed system resource is proportional to the number of the pixels to be rendered PXc. If number of the pixels PXc becomes less, those modules would also consume less processing time and memory bandwidth. Subsequently, the pixel shader 210 would decide the actually rendered pixels PXr according to the clipping judgment distance PXcz_DISc between the pixels PXcz, which have passed the Z test, and clipping plane. If number of the pixels PXc decreases, the pixel shader 210 would consume fewer resources. The operation of the Z-test module 208 and the color reading module 212 is the same as the conventional version, and thus no further detail will be described here. It is also an advantage of the present invention that enhances the efficiency of the apparatus for rendering a computer graphic primitive by adding an independent scissor window adjustment module 204 without altering the structure of other modules substantially.

Figure 6:
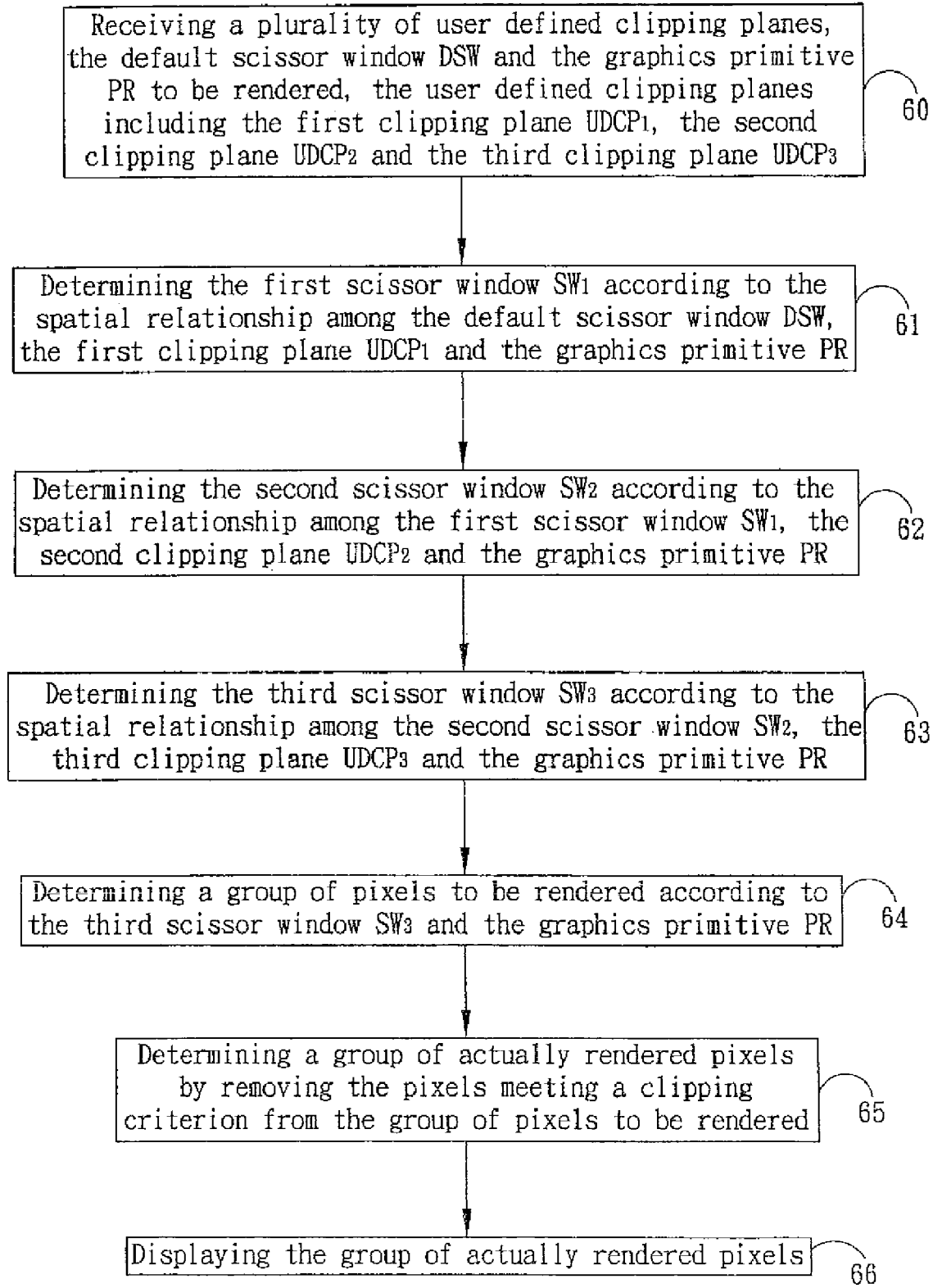
FIG. 6 illustrates a computer graphics primitive rendering method in accordance with an embodiment of the present invention.

As can be noted from the description above, the present invention also discloses a method for rendering a computer graphics primitive intersected with one or more user-defined clipping planes. FIG. 6 shows a method for rendering a computer graphic primitive according to an embodiment of the present invention. Only three user defined clipping planes are illustrated in FIG. 6, which is only for simplifying the description instead of limiting the scope of the invention.

Referring to step 60 of FIG. 6, the method receives a plurality of (three, in this exemplary case) user defined clipping planes, the default scissor window DSW and the graphics primitive PR to be rendered, the user defined clipping planes including the first clipping plane $UDCP_1$, the second clipping plane $UDCP_2$ and the third clipping plane $UDCP_3$. As mentioned before, clipping planes could be represented as space functions. Accordingly, it can be deemed that the method receives in step 60 three space function $f1(X, Y, Z)$, $f2(X, Y, Z)$ and $f3(X, Y, Z)$. Step 60 may be implemented in the vertex shader 202 shown in FIG. 2.

Step 61 determines the first scissor window $SW_1$ according to the spatial relationship among the default scissor window DSW, the first clipping plane $UDCP_1$ and the graphics primitive PR. Step 62 determines the second scissor window $SW_2$ according to the spatial relationship among the first scissor window $SW_1$, the second clipping plane $UDCP_2$ and the graphics primitive PR. Similarly, step 63 determines the third scissor window $SW_3$ according to the spatial relationship among the second scissor window $SW_2$, the third clipping plane $UDCP_3$ and the graphics primitive PR. Each of the steps 61 through 63 may include determining a collection of points according to a particular spatial relationship among geometric objects. For example, the collection of points may include vertices of the graphics primitive PR not clipped by the clipping plane under consideration UDCPi as well as the intersection points of the borders of the graphics primitive PR and the clipping plane UDCPi. The method disclosed in FIG. 4 may then be applied to adjust the range of an original scissor window (for example, the default scissor window DSW in step 61, the first scissor window $SW_1$ in step 62 and the second scissor window $SW_2$ in step 63) to generate a new scissor window (for example, the first scissor window $SW_1$ in step 61, the second scissor window $SW_2$ in step 62 and the third scissor window $SW_3$ in step 63). Steps 61 through 63 may be implemented in the scissor window adjustment module 204 shown in FIG. 2.

Then in step 64, a group of pixels to be rendered would be determined according to the third scissor window $SW_3$ and the graphics primitive PR. The group of pixels to be rendered may be determined, for example, by removing the pixels out of range of the third scissor windows $SW_3$ from the graphics primitive PR. The step 64 could be effected in the pixel interpolation module 206 shown in FIG. 2. In step 65, a group of actually rendered pixels are determined by removing the pixels meeting a clipping criterion from the group of pixels to be rendered. For instance, the clipping criterion may be defined as the points that make any one of the space functions $f1(X, Y, Z)$, $f2(X, Y, Z)$ or $f3(X, Y, Z)$ negative. The step 65 may be executed in the pixel shader 210 shown in FIG. 2. The group of actually rendered pixels would be displayed or presented onto a display device in step 66.

Due to the free choice of the presentation of a spatial function (e.g., one may freely select the spatial function $f(X, Y, Z)$ to be $aX+bY+cZ+d$, $aX+bY+cZ$, or $-aX-bY-cZ-d$), for example, the clipping criterion could also be defined as the points that make the spatial function positive. In general, the clipping criterion may be defined as the points make the outcome or the value of a spatial function falling into an infinite open interval. An infinite open interval is an infinite interval with an open end point. For instance, making a function negative is equivalent to make the function failing into the infinite open interval $(-\infty, 0)$. Those skilled in the art should appreciate that if the clipping criterion is defined to clip points making a space function falling into a specific open interval, say $(-\infty, EP)$, in which EP represents the open end of the interval, then points making the space function falling into another open interval $(EP, \infty)$ will be reserved (i.e., not clipped or unclipped) by the clipping criterion. The intersection of the interval $(-\infty, EP)$ and $(EP, \infty)$ is empty.

Although only preferred embodiments have been illustrated and described, it will be appreciated that various modifications may be made without departing from the scope of the present invention, which is intended to be limited solely by the appended claims.

What is claimed is:

1. A computer graphics primitive rendering method, comprising the steps of:
   receiving a graphics primitive, a clipping plane and a default scissor window;
   determining a second scissor window according to a spatial relationship among a first scissor window, the clipping plane and vertices of the graphics primitive, wherein range of the first scissor window is covered by range of the default scissor window, and the first scissor window is not the default scissor window;
   determining a group of pixels to be rendered by removing pixels out of range of an adjusted scissor window from the graphics primitive;
   determining a group of actually rendered pixels by removing pixels meeting a clipping criterion from the group of pixels to be rendered; and
   displaying the group of actually rendered pixels.

2. The method as claimed in claim 1, wherein the clipping plane is represented as a space coordinate function, and the clipping criterion is to judge if a pixel has a spatial coordinate making outcome of the space coordinate function falling into a first infinite open interval.

3. The method as claimed in claim 2, wherein the step of determining the second scissor window comprising:
   determining a collection of points, the collection including intersection points of borders of the graphics primitive and the clipping plane, and unclipped vertices of the graphics primitive;
   determining a largest Y-coordinate (vertical coordinate) among all Y-coordinates of points in the collection;
   determining a least Y-coordinate among all Y-coordinates of points in the collection;
   determining a largest X-coordinate (horizontal coordinate) among all X-coordinates of points in the collection;
   determining a least X-coordinate among all X-coordinates of points in the collection; and
   setting a boundary of the second scissor window to the largest Y-coordinate, the least Y-coordinate, the largest X-coordinate or the least X-coordinate,
   wherein the unclipped vertices are the vertices of the graphic primitives that make the outcome of the space coordinate function falling into a second infinite open interval having the same open end as the first infinite open interval, and intersection of the first and second infinite open intervals is empty.

4. The method as claimed in claim 3, further comprising determining a plurality of attributes of the vertices of the graphics primitive, the plurality of attributes comprising perspective correction factors.

5. The method as claimed in claim 4, wherein the step of determining the collection of points comprises calculating an intersection point of a border of the graphics primitive and the clipping plane by using an interpolation operation corrected by the perspective correction factors.

6. The method as claimed in claim 2 wherein the graphics primitive is a triangle and the first infinite open interval is $(-\infty), 0)$.

7. The method as claimed in claim 1, wherein range of the adjusted scissor window is covered by range of the second scissor window, but the adjusted scissor window is not the second scissor window.

8. A method computer graphics primitive rendering method, comprising the steps of:
   inputting a graphics primitive, a plurality of clipping planes and a default scissor window;
   determining a new scissor, window according to a spatial relationship among the default scissor window, the plurality of clipping planes and the graphics primitive, wherein range of the new scissor window is covered by range of the default scissor window, and the new scissor window is not the default scissor window;
   determining a group of pixels to be rendered by removing pixels out of range of the new scissor window;
   determining a group of actually rendered pixels by removing pixels meeting a clipping criterion from the group of pixels to be rendered; and
   displaying the group of actually rendered pixels.

9. The method as claimed in claim 8, wherein the plurality of clipping planes are respectively represented as a plurality of space coordinate functions, and the clipping criterion is to judge if a pixel has a coordinate making outcome of any of the space coordinate functions falling into an infinite open interval.

10. The method as claimed in claim 8, wherein the step of determining the new scissor window comprising:
    determining a collection of points according to the graphics primitive and the plurality of clipping planes;
    determining an extreme value among all coordinate values of points in the collection regarding a specific coordinate; and
    setting a boundary of the new scissor window to the extreme value,
    wherein the specific coordinate is a Y-coordinate or an X-coordinate, and the extreme value is a maximum or minimum value among the coordinate values of points in the collection.

11. The method as claimed in claim 9, wherein the graphics primitive is a triangle and the infinite open interval is $(-\infty, 0)$.

12. A computer graphics primitive rendering apparatus, comprising:
    a vertex shader, configured to receive a graphics primitive, a clipping plane and a default scissor window, and to determine a plurality of attributes of vertices of the graphics primitive;
    a scissor window adjustment module, configured to determine a second scissor window according to a spatial relationship among a first scissor window, the clipping plane and the graphic primitive, wherein range of the first scissor window is covered by range of the default scissor window, and the first scissor window is not the default scissor window;
    a pixel interpolation module, configured to determine a group of pixels to be rendered by removing pixels out of range of an adjusted scissor window from the graphics primitive; and
    a pixel shader, configured to determine a group of actually rendered pixels by removing pixels meeting a clipping criterion from the group of pixels to be rendered, and output the group of actually rendered pixels to a display buffer.

13. The apparatus as claimed in claim 12, wherein the clipping plane is represented as a space coordinate function, and the clipping criterion is to judge if a pixel has a spatial coordinate making outcome of the space coordinate function falling into a first infinite open interval.

14. The apparatus as claimed in claim 13, wherein the scissor window adjustment module executes the following steps to determine the second scissor window:
    determining a collection of points, the collection including intersection points of borders of the graphics primitive and the clipping plane, and unclipped vertices of the graphics primitive;
    determining a largest Y-coordinate (vertical coordinate) among all Y-coordinates of points in the collection;
    determining a least Y-coordinate among all Y-coordinates of points in the collection;
    determining a largest X-coordinate (horizontal coordinate) among all X-coordinates of points in the collection;
    determining a least X-coordinate among all X-coordinates of points in the collection; and
    setting a boundary of the second scissor window to the largest Y-coordinate, the least Y-coordinate, the largest X-coordinate or the least X-coordinate,
    wherein the unclipped vertices are the vertices of the graphic primitives that make the outcome of the space coordinate function falling into a second infinite open interval having the same open end as the first infinite open interval, and intersection of the first and second infinite open intervals is empty.

15. The apparatus as claimed in claim 14, wherein the plurality of attributes comprising perspective correction factors.

16. The apparatus as claimed in claim 15, wherein the step of determining the collection of points comprises calculating an intersection point of a border of the graphics primitive and the clipping plane by using an interpolation operation corrected by the perspective correction factors.

17. The apparatus as claimed in claim 13, wherein the graphics primitive is a triangle and the first infinite open interval is $(-\infty, 0)$.

18. The apparatus as claimed in claim 12, wherein range of the adjusted scissor window is covered by range of the second scissor window, but the adjusted scissor window is not the second scissor window.

* * * * *